(12) United States Patent
Wilkerson et al.

(10) Patent No.: US 8,719,502 B2
(45) Date of Patent: May 6, 2014

(54) ADAPTIVE SELF-REPAIRING CACHE

(75) Inventors: Christopher B. Wilkerson, Portland, OR (US); Alaa R. Alameldeen, Beaverton, OR (US); Jaydeep P. Kulkarni, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 208 days.

(21) Appl. No.: 13/436,758

(22) Filed: Mar. 30, 2012

(65) Prior Publication Data

US 2013/0262768 A1 Oct. 3, 2013

(51) Int. Cl.
*G06F 12/00* (2006.01)

(52) U.S. Cl.
USPC ............... 711/118; 711/3; 711/129; 711/154; 711/156

(58) Field of Classification Search
USPC ............... 711/118, 3, 129, 154, 156
See application file for complete search history.

(56) References Cited

U.S. PATENT DOCUMENTS

| | | | |
|---|---|---|---|
| 8,276,039 B2* | 9/2012 | Wuu et al. | 714/758 |
| 8,335,122 B2* | 12/2012 | Dreslinski et al. | 365/226 |
| 2009/0138658 A1* | 5/2009 | Dreslinski et al. | 711/118 |
| 2009/0172283 A1 | 7/2009 | Khellah et al. | |

* cited by examiner

*Primary Examiner* — Steven Elmore
(74) *Attorney, Agent, or Firm* — Kenyon & Kenyon, LLP

(57) ABSTRACT

A method for operating a cache that includes both robust cells and standard cells may include receiving a data to be written to the cache, determining whether a type of the data is unmodified data or modified data, and writing the data to robust cells or standard cells as a function of the type of the data. A processor includes a core that includes a cache including both robust cells and standard cells for receiving data, wherein the data is written to robust cells or standard cells as a function of whether a type of the data is determined to be unmodified data or modified data.

20 Claims, 4 Drawing Sheets

ADAPTIVE SELF-REPAIRING CACHE

FIELD OF THE INVENTION

The present disclosure pertains to employing mixed-cell caches to reduce cache misses, in particular, to adaptively using robust cells and standard cells for reliable storage of instruction and data for multi-core processors.

BACKGROUND

Multi-core processors, when used for certain applications, may consume a large amount of power. This is especially true with the increasing number of cores in multi-core processors. To enhance power efficiency in the face of ever-increasing number of cores, multi-core processors may run at lower voltages. While running at lower voltages may reduce the power consumption of multi-core processors, running the processors at lower voltage may decrease the number of usable cache lines, and therefore increase the probability of cache misses, namely, read and/or write errors of the cache.

FIG. 1 illustrates a multi-core processor 10 that include three levels of caches. The multi-core processor 10 may include a number of cores 12.1-12.4 that may each include a processing engine (not shown). The processor 10 may also include three levels (L1, L2, L3) of cache memories 14.1-14.4, 16, 18 for locally storing instructions and data. Instructions and data may be pre-fetched from the main memory 22 and stored locally in these three levels of caches so that the instructions and data may be accessed by processing engines locally from these caches rather than remotely from the main memory through the slow data bus 24.

Caches in the multi-core processor 10 may be organized according to hierarchical levels. Referring to FIG. 1, at the highest level, Level-3 (L3) cache 18 may be the main cache storage that may be shared by all cores 12.1-12.4 that may access cache 18 via an interconnect fabric 20. Although access to the L3 cache 18 via the interconnect fabric 20 is faster than access to the main memory 22 via bus 24, the access to the L3 caches 18 may still not fast enough for those frequently-accessed instructions and data. To this end, processor 10 may include, at the lowest level, Level-1 (L1) caches 14.1-14.4, each of which is within a respective core 12.1-12.4 so that the processing engine of the respective core may access instructions and data stored in the L1 caches 14.1-14.4 locally within each core and thus faster. The intermediate Level-2 (L2) cache 16 may be local to some cores (e.g., 12.1, 12.2), but not to all of the cores. In practice, L3 cache 18 usually have larger size, while Level-1 cache 14.1-14.2 are usually much smaller.

Each core 12.1-12.4 may run at a specific voltage (Vmin) and frequency (Fmax), which may be adjusted to allow the multi-core processor 10 working at different states. As discussed above, to reduce the power consumption for the multi-core processor 10, at least some of the cores 12.1-12.4 may run at a lower Vmin. For example, the cores may run at a near threshold voltage (NTV) of a core at approximate 590 mv rather than at around 700 mv for the normal operation.

Although running at lower voltage may save power, the lower voltage also increases the probability of cache failures or errors in caches read and/or write operations. Processors of current art may use a variety of error detection and correction mechanisms to counter cache misses and to ensure the integrity of instructions and data stored in the caches. Error-correction codes (ECC) are often used for L3 and L2 caches to ensure the correctness of the instructions and data stored therein. However, the smaller L1 caches are typically only protected with parity check which allows for only error detection but no correction. ECC is not used for L1 caches for two reasons. First, L1 caches support fast byte read and write to which ECC may require a large area overhead (e.g., up to 50% for correcting even a single error). Second, the latency overhead for applying ECC to L1 caches may also become significant and thus impractical.

In addition to the power consumption consideration, a multi-core processor may also age over the life cycle, which may also cause Vmin to become higher than the optimal operating voltage and thus cause cache errors. These cache errors are an especially prominent problem for L1 caches since L1 caches do not usually have error correction.

DESCRIPTION OF THE FIGURES

Embodiments are illustrated by way of example and not limitation in the Figures of the accompanying drawings.

DETAILED DESCRIPTION

Caches may be made from ways of bit cells. One common approach to increase memory reliability at low voltages is to upsize bit cells in the cache. Bit cells of a larger physical area than a standard bit cell have lower probability of having cache errors than the standard bit cells. When the size of bit cells become large enough, e.g., 2 times bigger than the standard bit cells, the chance of these larger bit cells to have cache errors may become so small that it can, for all practical purposes, be assumed that these larger bit cells do not cause cache errors at low Vmin. These larger bit cells are called "robust cells." In contrast, the regular, smaller bit cells are called "standard cells" which have a good chance to cause cache errors at low Vmin. In practice, each robust cell may include an identification bit that indicates a cell is a robust cell or not. Alternatively, robust cells may be pre-assigned to a certain portion of a cache. For example, the first two ways of a cache of eight ways may be assigned as robust cells. Although robust cells may resolve the problem of cache errors for the L1 cache, the cost associated with employing all robust cells for L1 caches (or for L2 and L3 caches) is prohibitively high. Therefore, it is not practical to deploy L1 caches of all robust cells.

Embodiments of the present invention may include a method for operating a cache that includes both robust cells and standard cells. The method may include receiving a data to be written to the cache, determining whether a type of the data is unmodified data or modified data, and writing the data to one of robust cells and standard cells as a function of the type of the data.

Embodiments of the present invention may include a processor including a core that includes a cache including both robust cells and standard cells for receiving data, wherein the data is written to robust cells or standard cells as a function of whether a type of the data is determined to be unmodified data or modified data.

Embodiments of the present invention may include a cache memory including both robust cells and standard cells for receiving data, wherein the data is written to robust cells or standard cells as a function of whether a type of the data is determined to be unmodified data or modified data.

Figure 1:
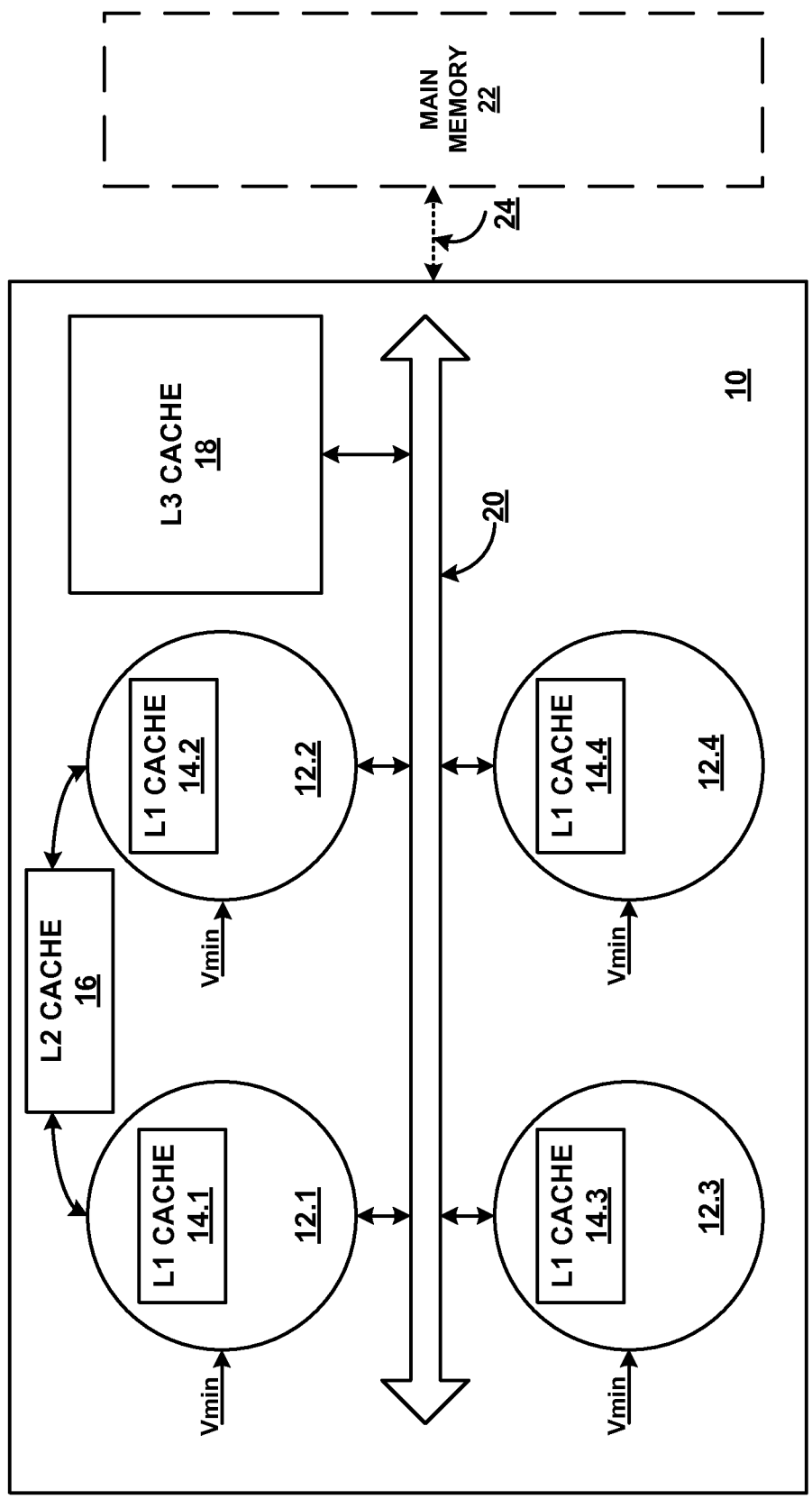
FIG. 1 illustrates a multi-core processor that includes different levels of caches.
Figure 2:
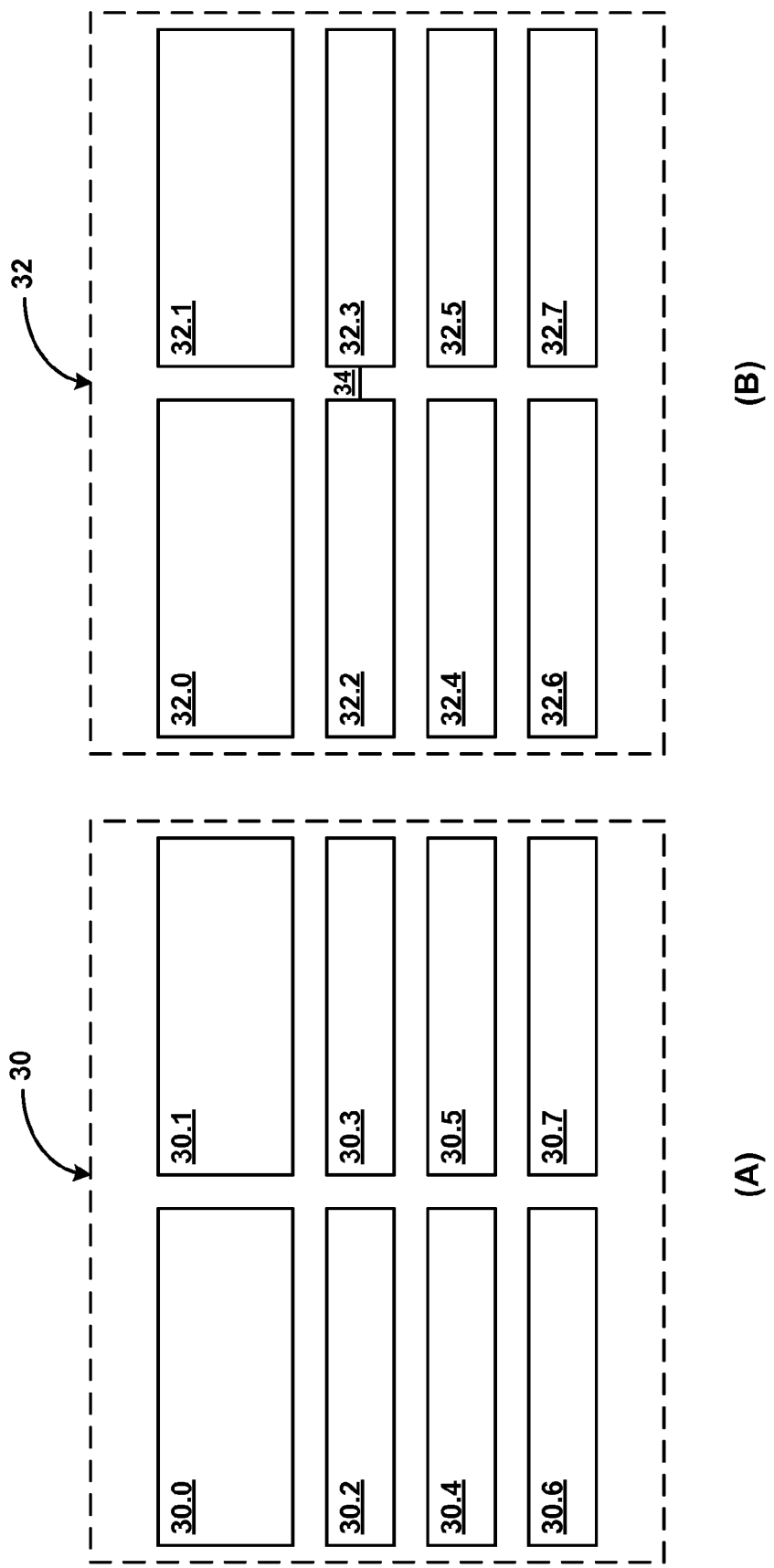
FIG. 2 illustrates a mixed-cell caches according to an embodiment of the present invention.

Embodiments of the present invention may employ caches that include both robust cells and standard cells. In particular, embodiments of the present invention may advantageously employ both robust cells and standard cells for L1 caches. In an embodiment, a robust cell may be at least two times of the size of a standard cell. Moreover, in a preferred embodiment, the robust cell may be 200% to 300% of the size of the standard cell. In an embodiment of the present invention, a small percentage of the cells in a cache may be implemented as robust cells, while most of the cells are still standard cells. FIG. 2A illustrates a mixed-cell cache 30 according to an embodiment of the present invention. Cache 30 may be an L1 cache that may include eight cache ways 30.0-30.7 among which cache ways 30.0, 30.1 are robust cells and cache ways 30.2-30.7 are standard cells. Each cache ways may include a plurality of cache lines for storing data.

In an embodiment of the present invention, instructions and data may be stored in either robust cells or standard cells according to the types of the cache lines. Cache lines in a data cache may fall into two categories of unmodified (or clean) and modified (or dirty) cache lines. Embodiments of the present invention may protect these two categories of cache lines differently.

Unmodified (clean) cache lines are copies of data that are stored in another part of the cache hierarchy or in memory. For example, data in a cache line in an L1 cache may be a copy of data in a cache line of a L2 (or L3) cache. Therefore, the cache line in the L1 cache is an unmodified cache line, which has a back-up copy in the corresponding cache line in the L2 (L3) cache. For unmodified (clean) cache lines, parity detection may be sufficient to protect these cache lines and ensure the correct operation. If an error in the unmodified cache lines is detected by the parity detection, the cache line may be invalidated, and the data in the cache line may be restored by copying the data from the backup copy stored in the higher levels of the cache hierarchy or from memory.

Modified (dirty) cache lines are those cache lines that do not have a copy stored in the higher levels of the cache hierarchy. Therefore, modified cache lines may be vulnerable to cache errors because data in modified cache lines is unique and may not be restored if a cache failure occurs. Therefore, failures in the modified cache lines need to be not only detected, but also corrected to ensure correct operation of the processor. Embodiments of the present invention may allocate the modified cache lines to the robust cells to preclude the possibility of cache line failures. To ensure that cache lines are allocated to the appropriate lines, embodiments of the present invention may cause all cache lines that are allocated due to a store miss to be allocated to cache lines in the robust cells.

While allocation of modified cache lines to robust cells may prevent loss of data caused by cache failure, modified cache lines sometimes may need to be stored in standard cells, which makes them vulnerable. For example, this may occur when the modified cache lines outnumber the available cache lines in robust cells because of the limited resources in robust cells. This may also occur if a write occurs to an unmodified (clean) cache line that was previously allocated to a cache line built with standard cells. One way to solve this problem is to initiate early writebacks of the data in these vulnerable cache lines to a higher-level cache (or to the main memory). However, under certain scenarios such as when cache bandwidth is at a premium, early writebacks may not be a desirable option.

Embodiments of the present invention may provide a partner line to a vulnerable cache line so as to provide redundancies to the vulnerable cache line. The partner line may be physically linked to a cache line built with the standard cells so that a data written to the cache line would cause a copy of the data to be written to the partner line. FIG. 2B illustrates a cache 32 according to an embodiment of the present invention. The cache 32 may include robust cell ways 32.0, 32.1, and further standard cell ways 32.2-32.7, in which standard cell way 32.2 has a partner cell way 32.3 by a physical link 34 so that a data that is written into cell way 32.2 is also written into cell way 32.3. Therefore, if any bit that is subsequently read from cell way 32.2 is determined by parity detection to contain errors, the data may be re-read from the corresponding copy stored in cell way 32.3 to ensure the correct recovery of the data.

In this way, the integrity of all data stored in the cache may be ensured. The integrity of data stored in unmodified cache lines may be guaranteed through the use of parity detection to identify erroneous data and if an error is detected, re-fetching a valid copy from a higher level in the cache hierarchy or from memory. A portion of data in modified cache lines may be protected by the allocation of these data to cache lines built with robust cells, and any remaining data that cannot be stored in the robust cells may be stored in cache lines built with standard cells through the use of redundant pairing of standard cache lines.

Figure 3:
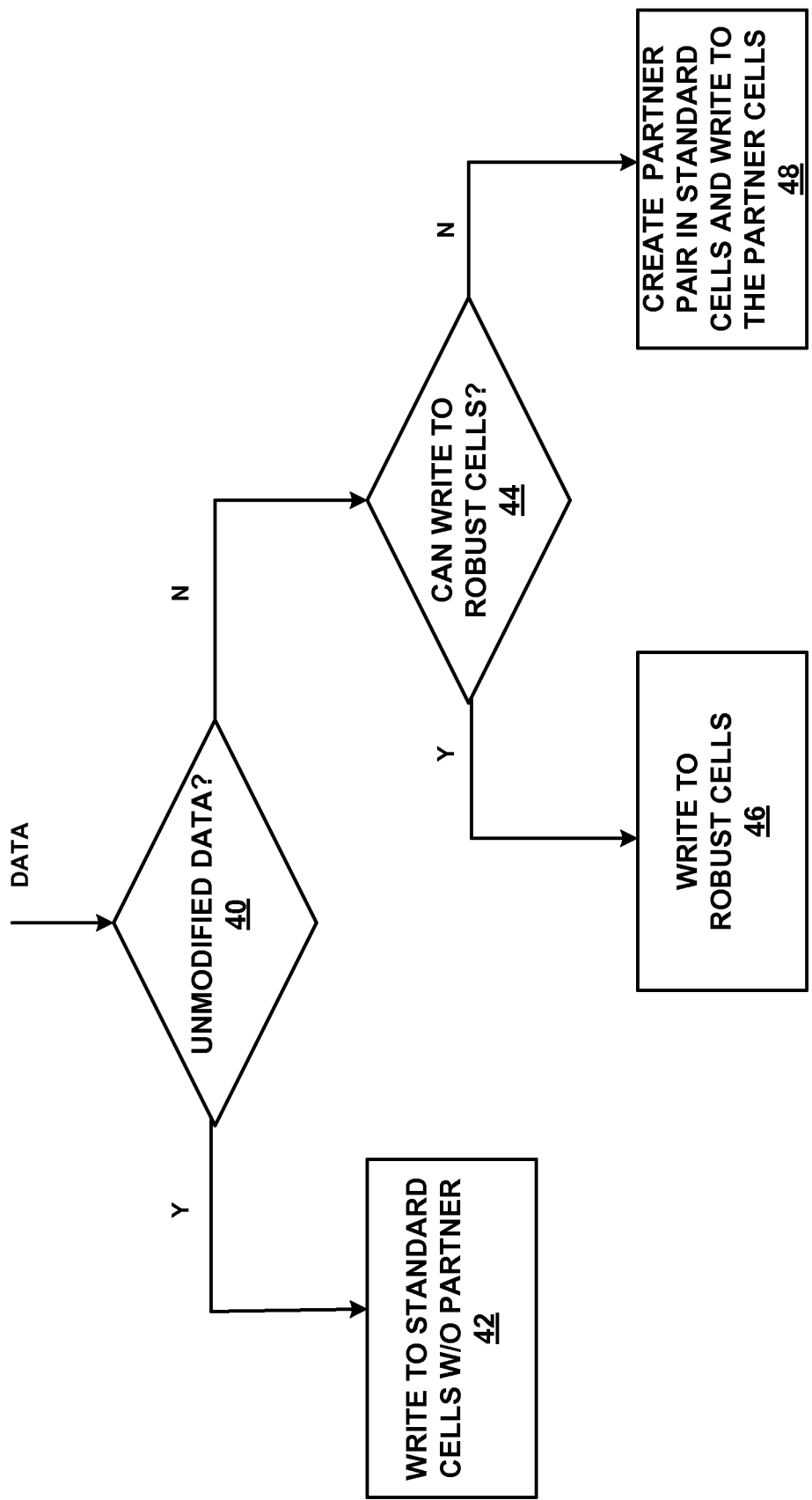
FIG. 3 illustrates a method for adaptively self-repairing cache according to an embodiment of the present invention.

FIG. 3 illustrates a method for writing to the adaptively self-repairing cache according to an embodiment of the present invention. A core may be configured to execute the method. Thus, at 40, the core may first determine if a piece of data that is to be written to a cache is unmodified data (or if a copy of the data is available at a higher level in the cache hierarchy). If the data is determined to be unmodified data (or those have a backup copy at a higher level of the cache hierarchy), at 42, the data may be written to a cache line of a standard cell. The cache line may be one without a partner line. However, if the data is determined to be modified data (or those do not have a back-up copy), at 44, the core may be configured to determine whether there are available cache lines built with the robust cells for storing the modified data. If it is determined that there are available cache lines built with the robust cells, at 46, the modified data may be written to the available cache lines in the robust cells. However, if it is determined for some reasons that there is no robust cache line available or it is undesirable to write to the robust cells, at 48, the modified data may be written to a cache line built with standard cells that has a partner line built with the standard cells.

Figure 4:
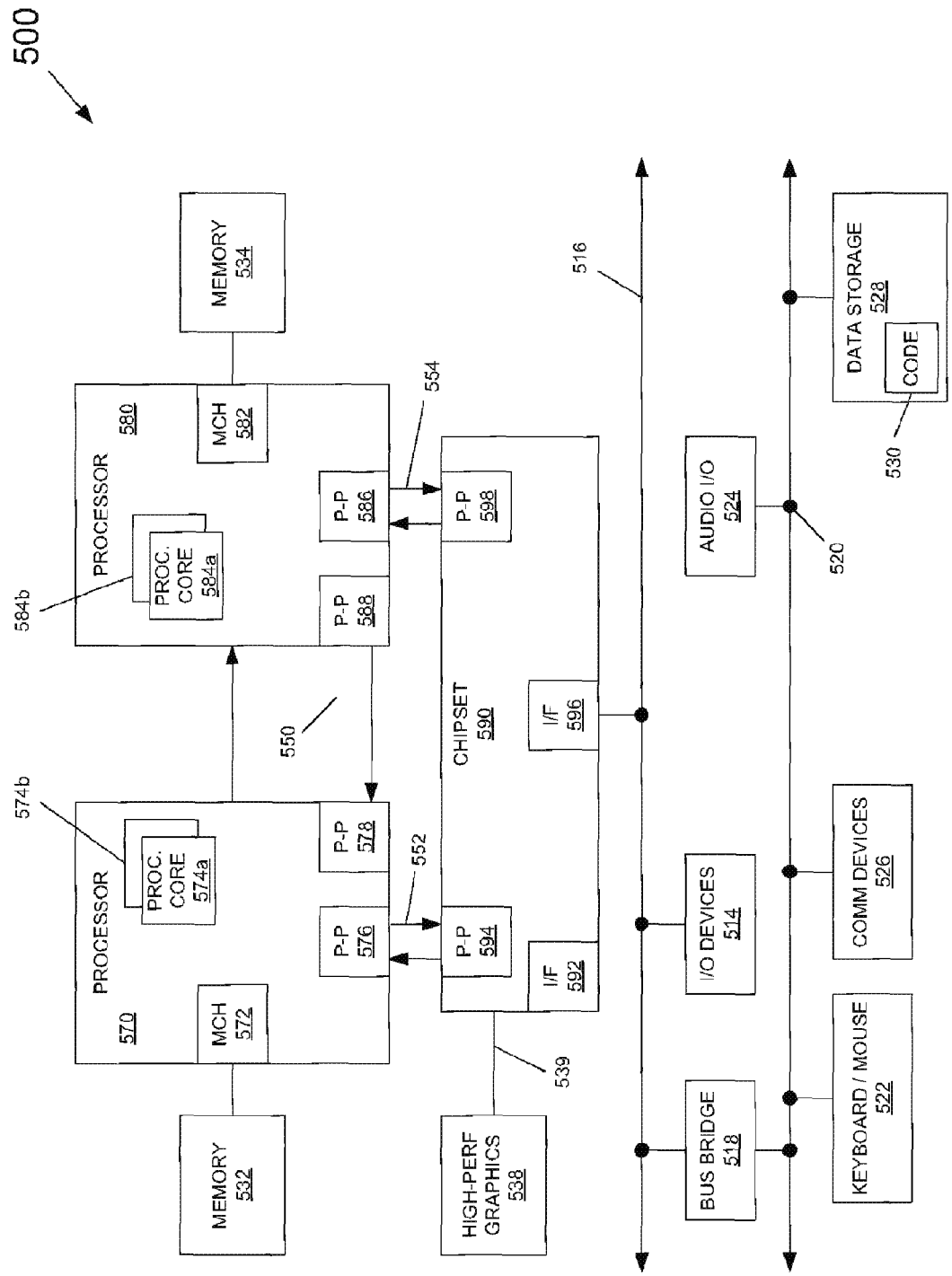
FIG. 4 is a block diagram of a system according to an embodiment of the present invention.

Embodiments may be implemented in many different system types. Referring now to FIG. 4, shown is a block diagram of a system in accordance with an embodiment of the present invention. As shown in FIG. 4, multiprocessor system 500 is a point-to-point interconnect system, and includes a first processor 570 and a second processor 580 coupled via a point-to-point interconnect 550. As shown in FIG. 4, each of processors 570 and 580 may be multicore processors, including first and second processor cores (i.e., processor cores 574a and 574b and processor cores 584a and 584b), and potentially many more cores may be present in the processors. The processors each may perform variation-aware scheduling based on profile information obtained and stored in on-chip storage in accordance with an embodiment of the present invention to improve energy efficiency.

Still referring to FIG. 4, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 4, MCH's 572 and 582 couple the processors to respective memories, namely a memory 532 and a memory 534, which may be portions of main memory (e.g., a dynamic random access memory (DRAM)) locally attached to the respective processors, and which collectively may maintain a directory. First processor 570 and second processor 580 may be coupled to chipset 590 via P-P interconnects 552 and 554, respectively. As shown in FIG. 4, chipset 590 includes P-P interfaces 594 and 598.

Furthermore, chipset 590 includes an interface 592 to couple chipset 590 with a high performance graphics engine 538, by a P-P interconnect 539. In turn, chipset 590 may be coupled to a first bus 516 via an interface 596. As shown in FIG. 4, various input/output (I/O) devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

Note that while shown in the embodiment of FIG. 4 as a multi-package system (with each package including a multi-core processor) coupled via point-to-point interconnects, the scope of the present invention is not so limited. In other embodiments, other interconnects such as a front side bus may couple together processors in a dual or multiprocessor system. Still further, understand that embodiments may further be used in uniprocessor systems, e.g., in a system having a processor with a single core or multiple cores.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method for operating a cache that includes both robust cells and standard cells, comprising:
   receiving a data to be written to the cache;
   determining whether a type of the data is unmodified data or modified data; and
   writing the data to robust cells or standard cells as a function of the type of the data.

2. The method of claim 1, further comprising:
   if the type of the data is determined to be unmodified data, writing the data to a cache line built with the standard cells; and
   if the type of the data is determined to be modified data, determining whether a cache line built with the robust cells is available to receive the data;
   if the cache line built with the robust cells is available, writing the data to the robust cells; and
   if the cache line built with the robust cells is not available, writing to the data to a cache line built with standard cells that has a corresponding partner cache line built with the standard cells.

3. The method of claim 2, further comprising:
   creating a partner cache line for the cache line built with the standard cells, wherein a bit written to the cache line is correspondingly written to the partner cache line.

4. The method of claim 1, wherein the cache is a cache that is embedded in a core of a multi-core processor, and wherein the cache is a Level-1, or Level-2, or Level 3 cache.

5. The method of claim 1, wherein the robust cells constitute 1 to 50 percent of cells in the cache.

6. The method of claim 5, wherein the robust cells constitute 10 to 30 percent of cells in the cache.

7. A processor, comprising:
   a core that includes a cache including both robust cells and standard cells for receiving data, wherein the data is written to robust cells or standard cells as a function of whether a type of the data is determined to be unmodified data or modified data.

8. The processor of claim 7, wherein the core is configured to:
   if the type of the data is determined to be unmodified data, write the data to a cache line built with the standard cells; and
   if the type of the data is determined to be modified data, determine whether a cache line built with the robust cells is available to receive the data;
   if the cache line built with the robust cells is available, write the data to the robust cells; and
   if the cache line built with the robust cells is not available, write to the data to a cache line built with standard cells that has a corresponding partner cache line built with the standard cells.

9. The processor of claim 8, wherein the core is configured to create the partner cache line for the cache line built with the standard cells, wherein a bit written to the cache line is correspondingly written to the partner cache line.

10. The processor of claim 7, wherein the cache is a cache that is embedded in a core of a multi-core processor, and wherein the cache is a Level-1, or Level-2, or Level 3 cache.

11. The processor of claim 7, wherein the robust cells constitute 1 to 50 percent of cells in the cache.

12. The processor of claim 11, wherein the robust cells constitute 10 to 30 percent of cells in the cache.

13. A computer device, comprising:
   a processor including:
      a core; and
      a cache that includes both robust cells and standard cells for receiving data, wherein the data is written to robust cells or standard cells as a function of whether a type of the data is determined to be unmodified data or modified data.

14. The computer device of claim 13, wherein the cache is a cache that is embedded in a core of a multi-core processor, and wherein the cache is a Level-1, or Level-2, or Level 3 cache.

15. The computer device of claim 14, wherein the core is configured to:
   if the type of the data is determined to be the unmodified data, write the data to a cache line built with the standard cells; and if the type of the data is determined to be the modified data, determine whether the robust cells are available to receive the data;
   if a cache line built with the robust cells is available, write the data to the robust cells; and
   if a cache line built with the robust cells is not available, write the data to a cache line built with standard cells that has a corresponding partner cache line built with the standard cells.

16. The computer device of claim 15, wherein the core is configured to create a partner cache line for a cache line built with the standard cells, wherein a bit written to the cache line is correspondingly written to the partner cache line.

17. The computer device of claim 13, wherein the robust cells constitute 1 to 50 percent of cells in the cache.

18. The computer device of claim 17, wherein the robust cells constitute 10 to 30 percents of cells in the cache.

19. A computer-readable non-transitory storage medium having stored thereon machine executable codes that, when executed, performs a method for operating a cache that includes both robust cells and standard cells, the method comprising:
receiving a data to be written to the cache;
determining whether a type of the data is unmodified data or modified data; and
writing the data to robust cells or standard cells as a function of the type of the data.

20. The computer-readable medium of claim 19, wherein the method further includes:
if the type of the data is determined to be unmodified data, writing the data to a cache line built with the standard cells; and
if the type of the data is determined to be modified data, determining whether a cache line built with the robust cells is available to receive the data;
   if the cache line built with the robust cells is available, writing the data to the robust cells; and
   if the cache line built with the robust cells is not available, writing to the data to a cache line built with standard cells that has a corresponding partner cache lines built with the standard cells.

\* \* \* \* \*